United States Patent Office 2,839,046
Patented June 17, 1958

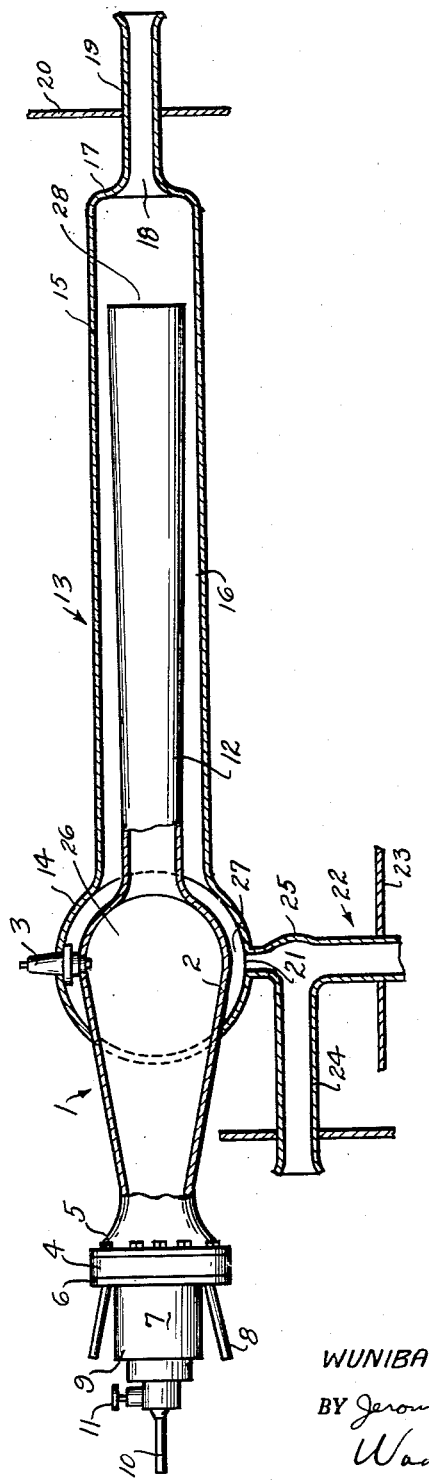

2,839,046
HEATING AND VENTILATING APPARATUS

Wunibald I. E. Kamm, Hoboken, N. J., assignor to the United States of America as represented by the Secretary of the Air Force Application March 23, 1954, Serial No. 418,247

8 Claims. (Cl. 126—110)

(Granted under Title 35, U. S. Code (1952), sec. 266)

The invention described herein may be manufactured and used by or for the Government for governmental purposes without payment to me of any royalty thereon.

This invention is a continuation in part of now abandoned patent application Serial No. 206,284, filed January 16, 1951, of W. I. E. Kamm, directed to an "Air-Oscillating Heater for Space Warming Purposes" and relates to a new and improved novel ventilating and heating apparatus for space heating which employs substantially no moving parts. The improved heating and ventilating apparatus is of the pulse type and employs a pulse jet type heater unit. The principles employed in the novel construction involve the setting up of an oscillating cushion of air in a resonator tube that effects a pumping action to accomplish a drawing in of air from the space to be heated to warm the air and returning it into the space to be heated in jet fashion in a manner to be described herein. The invention apparatus is particularly adaptable for heating air in vehicles or compartments or for defrosting purposes such as at windshields of vehicles or at the leading edges of aircraft wings and may simultaneously be used to heat engine space in a vehicle with exhaust gases and passenger space with uncontaminated air.

An object of the invention is to provide a lightweight compact heating and ventilating apparatus with a bare minimum of moving parts.

A further object of the invention is to provide a heating system which will provide a warm air output free of contamination.

Another object of the invention is to provide a ventilating and heating apparatus which can simultaneously provide a clean air output to one space and a contaminated air output to another whereby each space may be heated at the same time.

An additional object of the invention is to provide a pulse jet heater unit in combination with a "tuned" tube connected with the space to be heated into which tube the exhaust pipe of the heater unit extends whereby an oscillating cushion of air may be set up by the exhaust of the heater unit to provide a pumping action on the air in the space to be heated to draw it in, heat it, and pump it out to heat the space involved.

Other objects and advantages of the invention will be readily apparent to those versed in the art from the following description taken with the accompanying drawing wherein:

The figure is a view of the invention apparatus shown partly in section.

As can be readily seen in the drawing the heater unit comprises a combustion chamber 1 having a generally frusto-conical shape and having a domed head 2. Mounted in the domed head is a spark plug 3 which may be provided with any suitable source of electrical potential to provide a spark. At the intake to the combustion chamber is a flared skirt forming an opening. To the flared skirt is bolted a valve plate assembly 4 by bolts 5 which valve plate extends across the opening. An annular washer 6 spaces the valve plate and a carburetor 7 to provide an air space therebetween. Auxiliary air inlets 8 extend into this air space to provide air for mixture with the fuel spray delivered from the carburetor which has a main air inlet 9 and a fuel supply line 10 controllable by a valve 11.

The valve plate assembly may be of any suitable nature as long as it is a one-way valve which will permit ready and positive valve action for admission of the fuel mixture to the combustion chamber on demand during the operation of the heater unit. A typical valve arrangement of the type which may be used is shown in U. S. Patent No. 2,643,107, issued June 23, 1953, to Kamm et al.

Extending outwardly from the dome of the combustion chamber 1 is an exhaust pipe 12. It is noted that the heater unit in the practical embodiment of the invention shown is a resonant pulse jet type. Substantially enclosing the exhaust pipe 12 and the domed portion of the combustion chamber in which combustion takes place is a resonant enclosure or casing 13 composed of a substantially spherical section 14 into which the domed portion of the combustion chamber extends in sealed relation thereto and a cylindrical section 15 surrounding the exhaust pipe 12 in spaced relation thereto defining a substantially cylindrical chamber 16 of annular cross section therebetween. The cylindrical section 15 has an end closure 17 spaced from the mouth of the exhaust pipe and the end closure 17 has an opening 18 centrally thereof with a conduit section 19 extending therefrom into a compartment 20 to direct the exhaust gases from the exhaust pipe to compartment 20 for heating purposes. The compartment may house the engine of a vehicle for example.

The spherical section of the resonant enclosure has an opening 21 adjacent the domed portion of the combustion chamber extending therein. Connected to the opening 21 of the resonant chamber is a pulsator tube 22 which extends and opens into a compartment 23 to be furnished with clean warm air. The pulsator tube 22 as shown has a fresh air tube 24 from the atmosphere opening into a side thereof at right angles thereto. At portion 25 of the pulsator tube 22 the tube is widened to permit the fresh air to encircle the air stream therethrough.

As disclosed herein the combustion chamber 1 and exhaust pipe 12 form a resonant chamber having a definite natural period of vibration which may be approximately determined by the following formula:

$$f = \frac{a}{2\pi}\sqrt{F/LV}$$

in which:

$f$=frequency per second
$a$=speed of sound within the resonator in feet per second
$F$=cross sectional area of the tube in square feet
$L$=length of tube in feet
$V$=volume of the combustion chamber in cubic feet Also the resonant enclosure 13 is in the nature of an organ pipe and has a definite fundamental frequency which must be tuned to the fundamental resonant frequency of the pulse jet apparatus or correspond at least to a harmonic thereof. The effective result of the structural arrangement is a primary and a secondary oscillating system whereby a pumping system develops, the primary system comprising the pulse heater and the secondary system comprising the resonant tuned enclosure. The center of pressure in the primary system is in the domed head of the combustion chamber at 26 and the center of pressure in the secondary system is at 27 in the spherical section of the resonant tuned enclosure. The center of velocity of the apparatus at 28 of both systems is the approximate location of the acoustical coupling of the apparatus.

In the operation of the system, the heater unit is generally started by opening the fuel valve 11 to provide a fuel supply and a source of compressed air is actuated to introduce a jet of air through the main air inlet 9 to blow a charge of a combustible mixture into the combustion chamber 1. The spark plug 3 is then electrically actuated to ignite the mixture to cause an explosion and the products of combustion to enter the exhaust pipe 12 and travel substantially as a mass through the pipe at a very high velocity. The exhaust products leaving the combustion chamber and the tube 12 as an inert mass create a partial vacuum therein which acts on the valve assembly 4 to cause a fresh charge of combustible mixture to be drawn into the combustion chamber. It is noted that this partial vacuum in tube 12 also causes a drawing in of air from the area adjacent the outlet of tube 12 where air has been mixed with the exhaust gases discharged therefrom. As this gas-air mass enters the tube 12 a pressure increase obviously occurs therein establishing a sharp pressure differential relative to the partial vacuum in the system. This pressure increase within the tube 12 progresses as a wave with the speed of sound from the outlet opening of tube 12 towards the combustion chamber. This wave is influenced by wall friction and pressure wave reflections from the wall as well as wave interferences so that the wave front becomes steep as sea-waves on a shore. Though the pressure increase occurring thereby is relatively small, as the wave front builds up it causes a pressure impact on the combustible mixture drawn into the combustion chamber which ignites the combustible charge to begin a new cycle. There will be a cyclic repetition of this phenomena of self-ignition in this preferred heating system. It is noted that the method of ignition of the fuel mixture employed in the combustion chamber as presented herein may be varied as desired without altering the basic concept of the invention.

While on discharge of the exhaust products from tube 12 a portion of the exhaust products is discharged as a sharp jet through opening 18 and tube 19 from the tuned enclosure, the part that is not blown out through tube 19 enters the resonant enclosure 13 compressing the air therein. Since the enclosure 13 is tuned to the fundamental frequency of the pulse jet heater unit, the air within the enclosure will vibrate at the resonant frequency. This air oscillation will cause the build-up of standing waves in the enclosure to cause build-up of considerable static pressures, the peak pressure occurring at 27 in the spherical portion of the enclosure adjacent the opening 21 therefrom.

Thus, as the oscillating air builds up to a high pressure column in the tuned enclosure 13, a pumping action is exerted on the heated air surrounding the domed portion of the combustion chamber within the tunnel enclosure to pump it out of opening 21 through the pulsator tube 22 leading to the passenger compartment 23. Thus the heated air which is pumped out of opening 21 is uncontaminated by the exhaust gases since the air in the chamber 15 forms a wall between the exhaust gases and the fresh air. The conduit 19 affords a passage for exhaust gases to heat the engine compartment 20 at the same time. As shown in the preferred embodiment of the invention apparatus, a fresh air inlet tube 24 is employed with the pulsator tube 22 which tube 22 is so designed that on pumping of hot air from enclosure 14 a jet of warm air is channelled at high velocity initially past the widened portion 25 of tube 22 into which portion the fresh air tube 24 opens, to draw in a charge of fresh air and carry it through with the hot air to the enclosure 23. A check valve may be used in the fresh air intake tube 24 if desired.

As the pressure suddenly falls off in the tuned enclosure, another charge of air is taken from the room into the area about heating element 2 for heating. As the air is drawn in from the room, as a result of the design of tube 22, the velocity of such charge of air is increased and additional fresh air is drawn in to mix with this charge for heating. As is now clear, the column of air in chamber 16 is excited to produce pressure oscillations at the pressure antinode location at the inner end of orifice 21. Upon each pressure rise at 27, heated air is expelled through this orifice. Since air expelled from a confined space through an orifice leaves the orifice in an essentially straight direction, the heated air expelled through orifice 21 is in the form of a jet which goes into pipe 22 in line with the orifice. Upon each pressure drop at 27, air is sucked into the orifice from all sides. The swelling 25 facing the input end of fresh air duct 24 encourages the influx of fresh air into orifice 21. It is noted that this tube 24 may be readily omitted if desired where it is simply desired to gradually raise the compartment temperature without the addition of fresh air. Thus a continuing cycle will pump uncontaminated air in and out of the compartment 23 and all this is accomplished by the creation of the oscillating column of air resulting from the "tuned" system and the particular structural association presented herein. It is noted that the heat energy imparted to the air charge about the combustion chamber contributes to sustain the flow motion in tube 22 like a hot air piston engine.

As can be readily seen, the only moving element is the valve in the heater unit and the maintenance expense as well as the basic cost is reduced to a minimum by the simplified ventilating and heating apparatus.

The pumping phenomena involved in the operation of the "tuned" system whereby free and uncontaminated air may be supplied has been tried and has proven to be highly efficient.

While a particular practical embodiment and application of the invention apparatus has been disclosed herein, many modifications and additional applications of the invention will become readily apparent therefrom to those versed in the art. The invention is intended to be limited only as defined by the claims.

What is claimed is:

1. A space heating and ventilating apparatus comprising a pulse type jet combustion chamber having an exhaust tube extending therefrom, a casing forming a resonant chamber in tuned relation with the pulse jet frequency and substantially enclosing said exhaust tube, including the exhaust end thereof, and said combustion chamber, one end of the casing being spaced from the exhaust end of the exhaust tube and having an exhaust opening therein, said casing having a second opening from the space surrounding the combustion chamber, a pipe adapted to extend to a space to be heated and communicating with the second opening, and the second opening being disposed at substantially a pressure antinode whereby on firing in the combustion chamber to expel the discharge gases out said exhaust tube into said resonant chamber an oscillating column of air is established by the increase in pressure in the resonant chamber to discharge a jet of the heated air surrounding the combustion chamber through the second opening and the pipe into the space to be heated and on reduction of pressure in the resonant chamber a successive charge of air from the space to be heated is drawn through the pipe and the second opening to the space surrounding the combustion chamber.

2. A space heating and ventilating apparatus comprising a pulse jet motor means having a combustion chamber and an exhaust tube extending from the combustion chamber, a casing forming a resonant chamber tuned in relation to the pulse jet frequency and substantially enclosing the exhaust tube, including the exhaust end thereof, and the combustion chamber in spaced relation thereto, one end of the casing extending beyond the exhaust end of the exhaust tube and having an opening therein adjacent said exhaust tube to receive the exhaust gases therethrough, the casing having a second opening therein adjacent the space surrounding the combustion chamber, duct means communicating with the second opening and adapted to extend to a space to be heated, and the second opening being disposed at substantially a pressure antinode whereby on delivery of a jet of exhaust gases from the combustion chamber an oscillating column of air builds up in the resonant chamber as the pressure increases to pump a jet of air from the space surrounding the combustion chamber within the resonant chamber through the second opening and the duct means to the space to be heated.

3. A space heating and ventilating apparatus comprising a pulse jet type combustion chamber, means defining an exhaust outlet from the combustion chamber, a casing forming a resonant chamber tuned in relation to the pulse jet frequency and substantially enclosing the combustion chamber and the exhaust outlet means including the exhaust end thereof, one end of the casing extending beyond the exhaust end of said exhaust outlet means and having an opening therein to conduct the exhaust gas products therefrom, and a two-way connecting means from the space surrounding the combustion chamber within the casing to a space to be heated, said two-way connecting means communicating with the space within the casing at substantially a pressure antinode whereby on discharge of a charge of exhaust gas from the exhaust outlet means an oscillating column of air is set up in the resonant chamber between the exhaust outlet means and the space surrounding the combustion chamber within the resonant chamber to pump heated air therefrom through the two-way connecting means into the space to be heated.

4. An apparatus for heating and ventilating comprising a pulse jet heater unit including a combustion chamber having an exhaust pipe extending therefrom, a casing forming a resonant chamber frequency coupled to the exhaust pipe, including the exhaust end thereof, and substantially enclosing the combustion chamber and the exhaust pipe and spaced therefrom, one end of the casing extending beyond the exhaust end of said exhaust pipe and having an opening therein adjacent said exhaust pipe for exhaust gases, and means affording a two-way passage connected between the casing adjacent the combustion chamber and a space to be heated, said passage being connected to the casing at substantially a pressure antinode whereby on delivery of a jet of exhaust gases through the pipe the air in the surrounding space is caused to oscillate to pump the air surrounding the combustion chamber to be delivered to the space to be heated and the exhaust products discharging through the opening in the casing.

5. An apparatus for heating and ventilating comprising a pulse type heater unit having an exhaust pipe extending therefrom, a casing forming a resonant chamber concentric therewith, spaced therefrom and frequency coupled thereto whereby on discharge of exhaust gases the air within the resonant chamber is caused to oscillate effecting a pumping action, one end of the casing extending beyond the exhaust end of the exhaust pipe and having an opening therein for exhaust gases adjacent the end of the exhaust pipe, and a pulsator tube from the casing adjacent the heater unit to a space to be heated, said pulsator tube being connected to the casing at substantially a pressure antinode whereby on delivery of a jet of exhaust gases the air within the resonant chamber will be oscillated to pump contamination free heated air from the space adjacent the heater to the space to be heated.

6. In a heating system, a combustion chamber, an exhaust tube of substantial length extending therefrom to carry the products of combustion outwardly thereof in pulse jet fashion, a casing forming a resonant chamber tuned to the frequency of the pulse jet apparatus surrounding and substantially enclosing the exhaust tube including the exhaust end thereof, one end of the casing extending beyond the exhaust end of the exhaust tube and having an opening therein for the products of combustion, said casing having a discharge and intake opening adjacent the other end thereof, a hot air discharge and intake means aligned with said discharge and intake opening, a fresh air intake means connected at substantially right angles to the discharge and intake means, said discharge and intake opening being disposed at substantially a pressure antinode whereby on exhaust of the combustion gases through the exhaust tube air in the resonant chamber will oscillate at resonant frequency or a harmonic thereof to deliver a jet of hot air through the discharge and intake means during the high pressure phase of each oscillation along with fresh air from the intake means and to draw air into the resonant chamber during the low pressure phase of the oscillation.

7. Heating apparatus comprising a pulse jet burner unit including an exhaust pipe at the discharge opening of which the burner produces gas pulsations at pulse jet frequency, in combination with a casing forming a resonant chamber spaced around the exhaust pipe including the discharge opening thereof, the casing having an exhaust gas outlet at one end coaxial with the discharge opening of the exhaust pipe and an orifice at its opposite end leading to a space to be heated, said one end of the casing having the exhaust gas outlet extending beyond the discharge opening of the exhaust pipe, said orifice being disposed at substantially a pressure antinode, the casing and its gas outlet being so proportioned and spaced relative to the exhaust pipe and its discharge opening as to contain an air column such that one of its natural frequencies coincides with the pulse jet frequency in order to be set in oscillation by the gas pulsations and produce a pressure wave at the orifice on each pressure rise for expelling air from the resonant chamber through the orifice to the space to be heated and effective on each pressure drop for drawing air into the resonant chamber via the orifice.

8. Apparatus according to claim 7 in which said orifice is also connected to a fresh air supply to draw in air from this supply together with air from the heated space upon each pressure drop.

References Cited in the file of this patent
UNITED STATES PATENTS 2,612,748     Tenney et al.              Oct. 7, 1952
2,643,107     Kamm et al.             June 27, 1953